June 20, 1933.  R. A. NOBLE  1,914,454
WINDSHIELD HEATER
Filed June 24, 1930
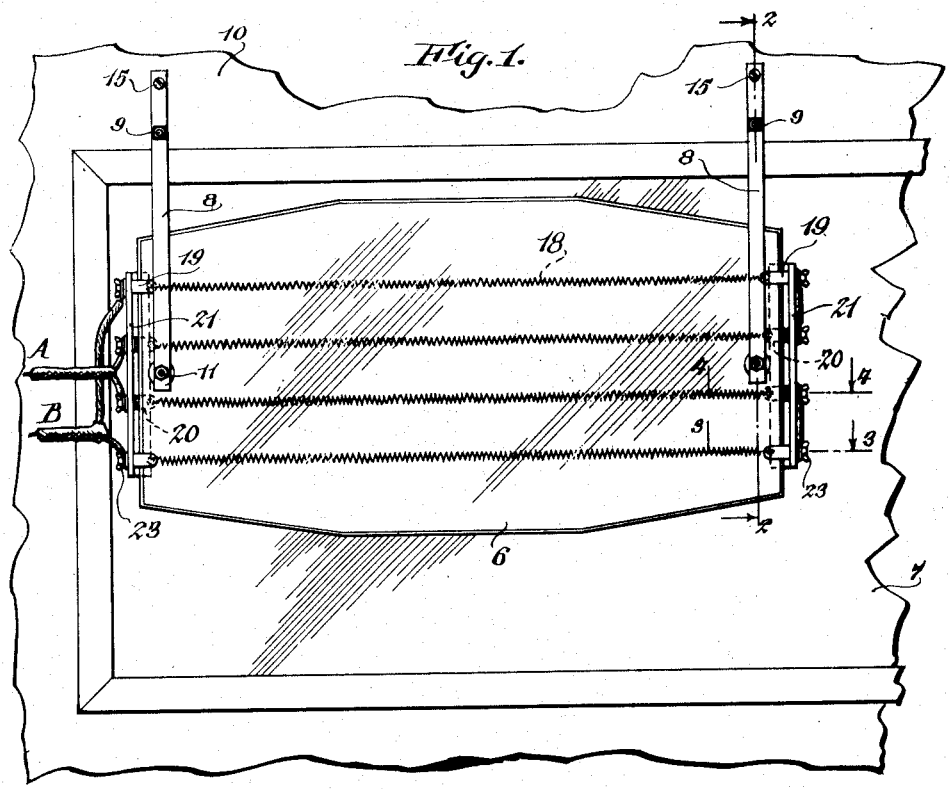
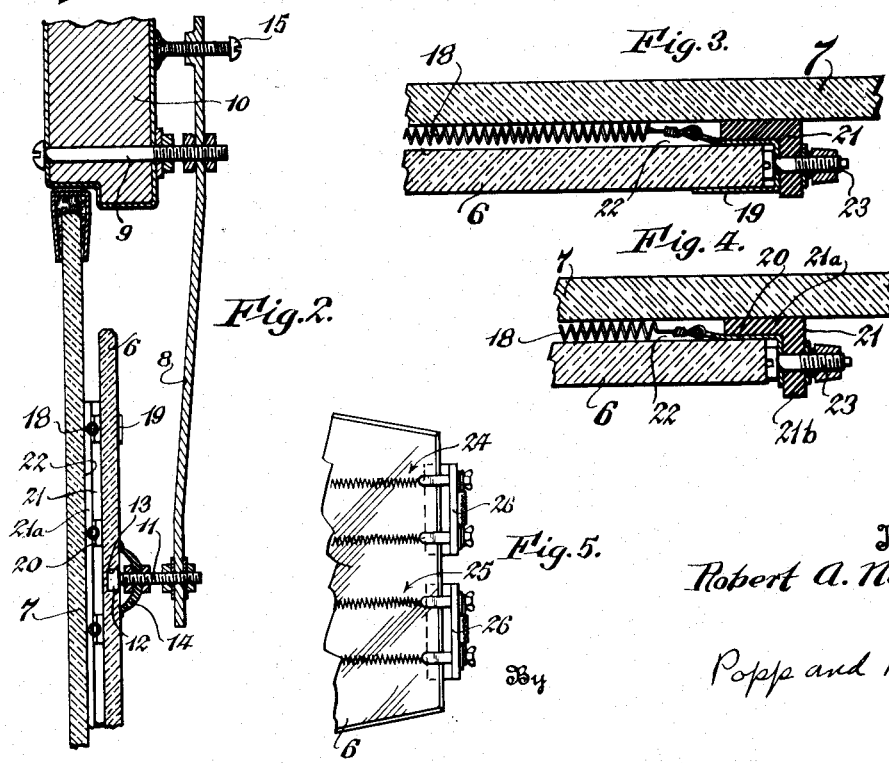
Inventor
Robert A. Noble
By Popp and Powers
Attorney

UNITED STATES PATENT OFFICE

ROBERT A. NOBLE, OF COWLESVILLE, NEW YORK

WINDSHIELD HEATER

Application filed June 24, 1930. Serial No. 463,512.

This invention relates to improvements in heating attachments for windshields.

One object of the invention is an attachment of the kind generally described which is readily applicable to and removable from a windshield and which, when not in use, will be supported firmly against the windshield, thereby preventing vibration and rattling of the device.

A further object is to provide a heating attachment in which the resistance elements are movable with respect to the windshield to permit the driver to adjust them as he may desire either to obtain a minimum obstruction of view or to ensure the most efficient operation of the device.

A further object is a heating attachment which will obtain the desired results with a minimum consumption of current.

The invention is illustrated in the accompanying drawing, in which:

Figure 1 is an inner face view of the device as applied to a windshield.

Figure 2 is a section along line 2—2 of Figure 1.

Figure 3 is a section along line 3—3 of Figure 1.

Figure 4 is a section along line 4—4 of Figure 1.

Figure 5 is a modified construction in which the resistance elements are arranged in groups, each group being adjustable with respect to the other.

The heating attachment as shown comprises a transparent panel 6 which is adapted to be supported in close proximity to a windshield 7 of any suitable construction. The supporting means, as shown, includes a pair of depending arms 8 which are pivotally secured to pins 9 carried by the body 10 of the vehicle, one arm being utilized for the support of each end of the transparent panel 6. At their lower ends, the arms 8 carry pins 11, the latter preferably having heads 12. The heads 12 fit into and conform with recesses 13 formed at the opposite ends of the panel 6. Vacuum cups 14 are suitably secured upon the pins 11 and at such a distance from the heads 12 that when the latter are inserted in the recesses 13 the vacuum cups 14 are compressed to remove the air within them and hence engage the panel. Thus the heads 12 prevent shifting of the panel 6 with respect to the windshield 7 while the vacuum cups 14 maintain a co-operating relation between the pins 11 and the panel 6. The panel 6 when in use is clamped firmly against the windshield 7 by the arms 8. To this end the said arms carry at their upper ends adjusting screws 15 which may be turned to engage the body 10 of the vehicle to pivot the lower end of the arm 8 inwardly thereby urging the panel against the windshield. In order to remove the attachment when its use is not desired, the screw 15 is loosened sufficiently to permit withdrawal of the headed pins 11 from the recesses in the panel 6. The arms 8 may then be pivoted laterally on the pins 9. The arms 8 being swung aside, the panel 6 may be readily removed after the wires which connect the device to power have been disconnected. It is to be noted that the recesses 13 which are formed in the transparent panel 6 and in which the heads 12 fit are of a depth less than the thickness of the said panel. This construction is desirable for two reasons; first, it enables the use of the vacuum cups 14 which could not be employed if the recesses extended through the panel and second, it avoids any projections from the opposite face of the panel which would interfere with the adjustment of the heating elements.

The panel 6 is adapted to be supported upon the windshield in the manner described in the line of vision of the driver. The said panel has two purposes; first, to provide a support for the resistance elements which are employed and second, to provide an air path between it and the windshield through which the said resistance elements extend thereby confining the heat to that portion of the windshield directly in the line of vision of the driver.

As shown and preferred, the resistance elements 18 are arranged horizontally upon the panel 6 between the panel and the windshield. At their opposite ends, the elements 18 are connected to clips 19 and 20 which are mounted upon insulating supports 21. It will be noted that the clips 19 are of U-shaped cross section and that they engage, preferably resiliently, both faces of the panel whereas the clips 20 engage only the outer face of the said panel. While the resistance elements 18 may be of any desired form they are preferably formed as best shown in Figure 3, into elongated resilient coils which, when in their natural shape are of a length substantially less than the distance between the clips to which their ends are secured. Thus, in arranging the supports 21 at the opposite sides of the panel 6 the resistance elements 18 are stretched and held in this position. As their tendency is to contract, they urge the supports 21 against the edges of the panel and, while holding them firmly in this position, permit adjustment of the supports upon the said panel. Adjustment of the supports may be desirable either to accommodate the arrangement of resistance elements to suit the taste of the particular driver or to obtain the most efficient operation of the attachment. The securement of the resistance elements upon the panel 6 in this manner has the further advantage that they may be readily removed to permit cleaning of the panel.

The insulating supports 21, as best shown in Figures 3 and 4, are of an L-shape. The horizontal leg 21a of the support extends inwardly to overlap the panel 6 whereby when the panel is secured against the windshield the said leg functions as a spacer to provide an air passage 22 between the panel and the windshield. This permits air to enter the lower entrance of the said passage and to pass upwardly toward the outlet of said passage, in which course it is heated by the resistance elements 18. The panel 6 confines the heated air within the passage and against the windshield. The vertical leg 21b of the support 21 extends lengthwise of the edge of the panel and is suitably apertured to receive binding posts 23 the latter being electrically connected to the resistance elements 18 through the clips 19 and 20. The attachment is designed to be connected to a suitable source of power, preferably the battery of the vehicle with which it is associated. While the resistance elements 18 may be connected to the said source of power in any arrangement desired, in the construction shown the two upper elements 18 which are in series are connected to one side of the battery with the lower two elements 18 which are also in series by a flexible lead A, both the upper and lower series being connected to the other side of the battery as by grounding the flexible lead B to the frame of the vehicle.

In the modified construction shown in Figure 5 the resistance elements are arranged in two groups 24 and 25 and each group is supported by individual supports 26 similar to the supports 21 described in connection with Figure 1. The supports 26 are spaced from each other and hence each group may be adjusted independently. In other respects the construction is the same as described in the first embodiment.

I claim as my invention:

1. A windshield heating attachment comprising a transparent panel adapted to be supported in close proximity to a windshield, a tensioned resistance element arranged across said panel between it and said windshield and supports for said element which lightly engage opposite sides of said panel, said supports being maintained in co-operating relation upon said panel by said element.

2. A windshield heating attachment comprising a transparent panel adapted to be supported in close proximity to a windshield, a tensioned resilient resistance element arranged across said panel between it and said windshield and supports for said element, said supports being maintained in co-operating relation with said panel by said element.

3. A windshield heating attachment comprising a transparent panel adapted to be supported in close proximity to a windshield, a tensioned resistance element arranged across said panel between it and said windshield and supports for said element adapted to lie along opposite edges of said panel and to space it from said windshield to provide an air path between the panel and windshield through which said element extends, said element urging said supports against the opposite edges of said panel.

4. A windshield heating attachment comprising a transparent panel adapted to be supported in close proximity to a windshield, tensioned resilient resistance elements arranged across said panel between it and said windshield and supports for said elements at opposite edges of said panel, said supports being utilized to provide an air path between said panel and windshield through which said elements extend, said elements urging said supports against the opposite edges of said panel.

5. A windshield heating attachment comprising a transparent panel adapted to be supported in close proximity to a windshield, a tensioned resistance element arranged across said panel between it and said windshield and adjustable supports carried by said panel to which said element is secured and by virtue of which said element may be adjusted upon said panel, said resistance element maintaining the said supports in co-operating relation upon said panel.

6. A windshield heating attachment comprising a transparent panel adapted to be supported in close proximity to a windshield, a tensioned resilient resistance element arranged across said panel between it and said windshield and adjustable supports at opposite sides of said panel to which said element is secured, said element maintaining the said supports in co-operating relation upon said panel and permitting their separation for adjustment and removal.

7. A windshield heating attachment comprising a transparent panel adapted to be supported in close proximity to a windshield, a tensioned resilient resistance element arranged across said panel between it and said windshield and adjustable supports to which said element is secured and which are maintained in co-operating relation upon said panel by said element, said supports spacing said panel from said windshield to provide an air path through which said element extends.

8. A windshield heating attachment comprising a transparent panel adapted to be supported in close proximity to a windshield, a heating element arranged across said panel between it and said windshield, supports carried at opposite edges of said panel and to which said element is connected, said supports slidably engaging the respective ends of the panel whereby they may be adjusted to adjust said element relative to said panel.

9. A windshield heating attachment comprising a transparent panel adapted to be supported in close proximity to a windshield, a heating element arranged across said panel between it and said windshield, supports at opposite edges of said panel formed to engage opposite faces of said edges and to which said element is connected, said supports slidably engaging the respective ends of the panel whereby they may be adjusted to adjust said element relative to said panel.

10. A windshield heating attachment comprising a transparent panel adapted to be supported in close proximity to a windshield, a heating element arranged across said panel between it and said windshield, supports at opposite edges of said panel formed to resiliently engage opposite faces of said edges and to which said element is connected, said supports slidably engaging the respective ends of the panel whereby they may be adjusted to adjust said element relative to said panel.

In testimony whereof I affix my signature.

ROBERT A. NOBLE.